United States Patent Office 3,115,488
Patented Dec. 24, 1963

3,115,488
ALGINIC ACID METHYL ESTER SULFATES, PREPARATION AND MOLECULAR WEIGHT FRACTIONATION THEREOF
Harvey E. Alburn, Paoli, Pa., assignor to American Home Products Corporation, New York, N.Y., a corporation of Delaware
No Drawing. Filed Feb. 29, 1960, Ser. No. 11,412
7 Claims. (Cl. 260—209.6)

This invention relates to alginic acid methyl ester sulfate. More particularly it relates to such a methyl ester sulfate having a molecular weight in the range 1200–8000, preferably 2000–6700 and to methods of preparing it. This material has value as a blood anticoagulant and as a lipemia-clearing agent in the animal organism for biochemical research and for therapy.

Since the ester sulfate in free form, i.e. as an acid, would be difficult to isolate and unstable if isolated, it is isolated in the form of a salt, e.g. a sodium salt. Since, however, the polymeric acid radical is the important functioning portion of the molecule, the products of this invention are referred to in the disclosure and claims for simplicity's sake as alginic acid methyl ester sulfate, the salt form being understood unless otherwise specified.

The blood-anticoagulant effect of intravenously administered alginic acid sulfate has been known for some time, as has that of pectic acid methyl ester sulfate.

It has since been discovered that alginic acid methyl ester sulfate not only is an effective anticoagulant, but in addition has a useful and valuable lipemia-clearing effect in relatively much smaller doses. Since the ester is a highly polymeric material, the molecular weight of fractions used for pharmacological experiments or for animal or human therapy is of importance. It has been found that preparations in the molecular weight range 1200–8000 are effective, but the range 2000–6700 is preferred. Compositions within these relatively low ranges appear to distribute more readily through the organism and to be freer of side effects than those having a more massive molecular structure. The controlled molecular weight range and the presence of the methyl ester group combine to make the ester sulfate physiologically effective when administered by the intramuscular or even the oral route.

It is an object of this invention to provide fractions of alginic acid methyl ester sulfate in the molecular weight range of 1200–8000 having lipemia-clearing properties and to provide effective methods for preparing and fractionating the ester.

Polymeric products of this type are not assemblies of like chemical individuals but include basic units in various degrees of polymerization and types of linkage. Since the chemical properties of the building unit are in general possessed by the polymerized product, it is customary and convenient to refer to it as an acid, ester or the like. This practice is followed in the present specification and claims.

According to my invention I first esterify commercial alginic acid with methanol. While it might seem that the alginic acid could be first sulfated and then methoxylated, I have found that methoxylation tends to hydrolyze off some of the sulfate groups, so this order of procedure is unsatisfactory.

I may form alginic acid methyl ester by refluxing alginic acid with methanolic HCl (e.g. 5–10% HCl), the concentration of alginic acid, for example, being 8–12 g./l. and its moisture content 0–10%. Alternatively $H_2SO_4$ may be used instead of HCl, but with somewhat less constant results.

The methoxyl content of the ester may not reach the theoretical maximum, possibly because the carboxyl groups of a polyguluronic acid moiety in the alginic acid are less easily esterified than those of the mannuronic portion of the molecule.

A product with a further reduced methoxyl content can be produced, if desired, by shaking alginic acid with methanolic HCl at room temperature instead of at an elevated temperature.

Considerable depolymerization of alginic acid takes place during methoxylation, the molecular weight decreasing as a function of heating time.

Sulfation of the methyl ester is most satisfactorily accomplished by treating it at somewhat above room temperature with chlorosulfonic acid in the presence of pyridine as an acid acceptor. As in the case of methoxylation, less of the new group is introduced than corresponds to the theoretical number of groups available for reaction. Moderate variations of time and temperature conditions cause little variation in yield, methoxyl content or sulfate content—e.g. sulfation at 77° C. for 0.5–2.0 hours compared with sulfation at 100° C. for 1–5 hours. All the sulfated products were obtained in the form of their sodium salts.

As a modification of this reaction, alginic acid methyl ester sulfamate may be made by reacting the methyl ester with sulfamic acid instead of chlorosulfonic acid.

Fractionation of the methyl ester sulfate may be carried out by one or a combination of several methods. Among these methods are: (a) Fractional precipitation from an aqueous solution by a water-soluble organic liquid precipitant; as examples, acetone is the preferred liquid but isopropanol and formamide are also satisfactory; methanol, ethanol and ethylene glycol also cause fractional precipitation but yield less easily filterable precipitates. (b) Fractional extraction with an aqueous solution of a water-soluble organic liquid selective solvent; acetone is again the preferred liquid, but others may be used. (c) Dialysis of an aqueous solution of the methyl ester sulfate through a semipermeable membrane. (d) Fractional adsorption followed by fractional elution with an aqueous solution of a water-soluble organic liquid selective solvent, acetone being again the preferred solvent and diatomaceous earth an effective adsorbent.

In these procedures the more soluble and more dialyzable fractions contain the lower molecular weight portions of the product.

Among the several methods for determining the molecular weight of polymeric substances may be mentioned chemical determination of characteristic end groups of the polymeric chain, determination of the viscosity of polymer solutions, and osmometric measurements on polymer solutions. The first method depends on the uniformity of chain types present and the correctness of assumptions as to chemical structure. The viscosimetric method gives good relative but not absolute values. The osmometric method gives absolute values for the present product which indicate an accuracy of about ±6% on the basis of comparative tests on products of known molecular weight in the relevant range.

The molecular weights of the various fractions described are, of course, average molecular weights of the constituent chemical individuals, and were determined osmometrically by a modified dynamic osmometer of the Fuoss and Mead type.

The following examples describe specific embodiments of the various steps of my invention, but they are intended to be illustrative only and not to limit the scope of my invention, which is defined in the appended claims.

EXAMPLE 1

*Methylation of Alginic Acid—HCl*

(a) One hundred grams dry alginic acid was refluxed for 12 hours in 1 l. methanol in which was dissolved 50 g.

HCl gas. The resulting suspended material was filtered off, washed with methanol first, then with acetone, and dried. Yield, 50%; —$OCH_3$ content, 16.49%. Theoretical —$OCH_3$ for $(C_7H_{10}O_6)_n$ 16.32%.

(b) If a less completely esterified product is desired the reaction may be carried out at room temperature. Shaking alginic acid in 10% methanolic HCl at room temperature gave:

| Hours | 24 | 36 | 100 |
|---|---|---|---|
| —$OCH^3$, percent | 6.66 | 8.71 | 13.13 |

EXAMPLE 2

Methylation of Alginic Acid—$H_2SO_4$

The method was similar to that of Example 1a; 125 ml./l. $H_2SO_4$ being substituted for the HCl. The concentration of alginic acid was 8–12 g./l., the moisture content of the alginic acid was 0–10% and the time of refluxing 7–15 hours. Yields were in the range 39–67% and —$OCH_3$ content of the ester 13.72–15.19%.

EXAMPLE 3

Sulfation of Alginic Acid Methyl Ester

Eight hundred and fifty milliliters pyridine was placed in a 3-liter, 3-necked round-bottom flask equipped with a stirrer, a dropping funnel and a thermometer, flask and contents were cooled in an ice bath and 298 g. chlorosulfonic acid added with stirring at a rate to maintain the temperature of the mixture at 25°–30° C. After this addition, the temperature was raised to 78° C. and 32.5 g. alginic acid methyl ester added. The resulting mixture was held at this temperature for 1 hour with stirring. The reaction mixture was poured over an equal volume of cracked ice and stirred till the ice melted, and the resulting solution poured into 8 volumes 95% ethanol. The mixture was settled, the supernatant decanted, the residue filtered, and the precipitate washed with ethanol, acetone and dried in a steam cabinet.

The dried solid was dissolved in 12 times its weight of 50% aqueous acetone and the pH adjusted to 7.5 with 50% NaOH. The methyl ester sulfate sodium salt was precipitated with 4 volumes acetone and salted with a small amount of saturated aqueous NaCl. The precipitate was settled and, after decantation of the supernatant, was filtered, washed with acetone and dried.

This material analyzed: S, 15.1%; —$OCH_3$, 5.71%; Na, 11.48%.

EXAMPLE 4

Alginic Acid Methyl Ester Sulfamate

Instead of sulfate, the sulfamate of the methyl ester may be prepared. Alginic acid methyl ester was heated at 105° C. with a slight excess of sulfamic acid in pyridine and the product isolated substantially as in Example 3. Some deesterification occurred in this reaction, the —$OCH_3$ content ranging from 4% to 5.4% as compared with the theoretical 8.92%.

The sulfamate, unlike the sulfate, is not isolated as a sodium salt; it is per se relatively stable since the presence of the amide group eliminates the acidity of the unsubstituted sulfate group.

EXAMPLE 5

Fractionation of Alginic Acid Methyl Ester Sulfate

Twenty grams of alginic acid methyl ester sulfate, prepared as described in Example 3, was dissolved in 200 ml. water and 2 ml. of a saturated aqueous NaCl solution added. Acetone was then added slowly with agitation in portions and the precipitate removed by centrifugation after each portion. The volume of acetone added in each portion, the weights of the precipitates obtained and their viscosities are given in the following table:

TABLE I.—FRACTIONATION OF ALGINIC ACID METHYL ESTER SULFATE

| No. of Fraction | Vol. Acetone Added (ml.) | Weight of Fraction (g.) | Viscosity $[\eta]$* |
|---|---|---|---|
| 0 | 0 | 20 g. (starting material). | 73 |
| 1 | 160 | 7.3 | 101 |
| 2 | 50 | 3.0 | 90 |
| 3 | 100 | 4.3 | 89 |
| 4 | 2,000 | 1.4 | 56 |

*Determined as follows: The solvent was 0.5 M $NaNO_3$; the relative viscosity of the solution minus that of the solvent at four different concentrations, divided in each case by the concentration, was determined and plotted against concentration. Extrapolation of the curve to zero concentration gave intrinsic viscosity.
$[\eta]$=intrinsic viscosity × 100.

Alternatively fractional extraction may be used to separate high from low-molecular-weight material. The aim of the following procedure was to remove approximately the half of the crude sulfated product with the highest molecular weight and then to extract from the balance the very low-molecular-weight material and any salts that might have been present.

Seven hundred grams of the sodium salt of crude alginic acid methyl ester sulfate was stirred at room temperature with 7 l. 40% (by volume) aqueous acetone for several hours. The insoluble material—the high-molecular-weight fraction—was settled by centrifugation. The clear supernatant was mixed with 3 volumes acetone and 10 ml. saturated NaCl solution to effect precipitation of a fraction of intermediate molecular weight, which was washed with acetone and dried. The yield was 354 g.

Material of lower molecular weight was separated from this fraction by suspending 290 g. of it in 2900 ml. 60% (volume) aqueous acetone at room temperature with stirring for several hours. The insoluble ester salt, separated as above, amounted to 242 g. This constituted a fraction freed of constituents of very high and very low molecular weight.

Dialysis and chromatography may also be used to separate fractions of varying molecular weight.

To effect fractionation by chromatography, alginic acid methyl ester sulfate sodium salt was absorbed to diatomaceous earth in a column and fractionally eluted with aqueous acetone of decreasing acetone concentration. Thirty-seven fractions were collected of decreasing molecular weight.

EXAMPLE 6

Molecular Weights of Fractions

The apparatus and technique used in determining the average molecular weights of various fractions were similar to those described by R. M. Fuoss and D. J. Mead (J. Phys. Chem., 47, 59 [1943]) for the dynamic determination of the molecular weight of polymers.

Various concentrations of solute were put on one side of a semipermeable cellophane membrane and solvent on the other side so that the pressures on the two sides were nearly equal. The pressure on the solute side was adjusted by the height of the fluid in the capillary and readings were taken and plotted over a short period of time as the system approached equilibrium. The pressure was then adjusted slightly higher on the solvent side and readings were again taken and plotted as equilibrium was approached. The resulting data were plotted against time and extrapolated to a half-way point which would theoretically be reached at infinite time and this figure was used to calculate the osmotic pressures of the different concentrations of polymer. These data were plotted and extrapolated to zero concentration to obtain the molecular weight.

The average molecular weight of a given fraction is a statistical quantity which depends on the molecular complexity of the starting product, alginic acid, on the extent of depolymerization of the starting material resulting from the methylation and sulfation steps, and on the fractionation procedures used in recovering final products. Since alginic acid is a natural product, the molecular complexity of available material is subject to some variation. Accordingly, as in the case of many derivatives of natural products, a certain amount of experimentation is required for each batch to obtain a product in a desired given range. However, since the average molecular weight (as noted above) is determinable within about ±6%, control of the final product is readily effected.

Unfractionated products made substantially as described in Example 3 ranged in molecular weight from 7200 to 8000.

Fractional precipitation by adding acetone to a water solution of such material yields a series of fractions of decreasing viscosity and molecular weight (Table I).

Fractional extraction with 40% acetone as in lines 27 to 35, column 4, may yield a soluble fraction of molecular weight 5900–6000. Dialysis of such a fraction and rejection of the low-molecular-weight dialyzate may raise the average molecular weight, e.g. to 6400.

Of the 37 fractions obtained by chromatography, lines 45 to 50, column 4, 26 representative fractions were tested with the following results:

| Percentage of the whole— | Average M.W. |
|---|---|
| 16% | 3500–5500 |
| 75% | 5500–6700 |
| 9% | 6750–6900 |
| Nil | Over 6900 |

Fractions in the intermediate range, 5500–6700, which are active in lipemia clearing, contain dialyzable material of lower molecular weight which retains much of this activity. Such material may include active constituents having a molecular weight in the 1200 range.

EXAMPLE 7

*Physiological Properties*

As noted earlier alginic acid methyl ester sulfate in the molecular weight range 1200–8000 has pronounced lipemia-clearing properties in both lower animals and humans and exhibits this action when administered intramuscularly. As is will known, the intramuscular route offers outstanding advantages over the intravenous route, in simpler technique, reduced number of injections, saving of time of physician and nurses, and increased comfort for the patient.

In clinical use the minimum effective dose for serum-cholesterol depression is of the order of 2.5 mg./kg. per day; smaller doses, however, of the order of 1.25 mg./kg. per day reduced total liquids and turbidity to some extent. In special cases the dosage may be as high as 10 mg./kg. per day. In the lower dosage range none of the characteristic anticoagulant effect of alginic acid sulfate is exhibited, but at 5 mg./kg. per day this effect begins to be evident. The product had an average molecular weight approximately in the 5500–6500 range.

Alginic acid methyl ester sulfate in the above noted molecular weight range showed a complete absence of acute toxicity in mice on intravenous injection up to 1500 mg./kg.

In human beings the drug was well tolerated without substantial side effects at dosages of less than 5.0 mg./kg. per day. In the higher range of dosage, e.g. 5 mg./kg. twice daily, transient side effects were sometimes produced such as tingling or pressure sensations in tongue, scalp or extremities, or muscle pains, occurring one-half to one hour after injection and lasting only a few minutes. A dose of 5 mg./kg. per day may have a mild anticoagulant effect one hour after injection with return to normal in six hours. There was no effect on bleeding time.

The reduction of serum cholesterol and total lipids resulting from injection of the drug intramuscularly in daily dosages of from 1.25 to 10 mg./kg. for periods of from 6 to 21 days in patients with serious symptoms of vascular origin was accompanied by a marked relief or complete disappearance of these symptoms during treatment and for several weeks thereafter.

While in the previous examples, the alginic acid methyl ester sulfate has been described as isolated in the form of its sodium salt, it is possible to recover it in the form of other salts, for example salts of other alkaline metals or alkaline earth metals or organic bases. In Example 3 during the sulfation in the presence of pyridine, the pyridinium salt was formed. In the next step in which the sodium salt was recovered, substitution of KOH for NaOH will yield the potassium salt, and other hydroxides, oxides, carbonates may be used.

I claim:

1. The method of preparing a fraction of aliginic acid methyl ester sulfate of lower average molecular weight of from 3500–6700 from a fraction of higher average molecular weight in the range of 7200–8000 which comprises stirring the higher-molecular-weight fraction with several times its weight of dilute aqueous acetone at room temperature until that fraction of the alginic acid methyl ester sulfate which is soluble in acetone is substantially completely dissolved, settling the undissolved residue, mixing the clear supernatant with about 3 volumes of anhydrous acetone and recovering the resultant precipitate.

2. The method of preparing alginic acid methyl ester sulfate having an average molecular weight in the approximate range 5500–6500 which comprises stirring alginic acid methyl ester sulfate having an average molecular weight in the approximate range 7200–8000 with substantially 9 times its weight of 40% aqueous acetone for several hours at room temperature until that fraction of the alginic acid methyl ester sulfate which is soluble in acetone is substantially completely dissolved, settling the insoluble material, mixing the clear supernatant with 3 times its volume of anhydrous acetone and a small amount of saturated aqueous NaCl, and recovering the resulting precipitate.

3. The method of further treating the fraction of alginic acid methyl ester sulfate obtained according to claim 2 to remove material of relatively lower molecular weight which comprises stirring 25 g. of the ester sulfate with 250 ml. 60% by volume aqueous acetone for several hours at room temperature until that fraction of the alginic acid methyl ester sulfate which is soluble in acetone is substantially completely dissolved, and recovering the undissolved residue.

4. An alginic acid methyl ester sulfate fraction having an average molecular weight in the range 5500–6700.

5. An alginic acid methyl ester sulfate fraction having an average molecular weight in the range 3500–5500.

6. The method of preparing a fraction of sulfated alginic acid methyl ester freed of relatively high- and relatively low-molecular-weight constituents which comprises: preparing the methyl ester of alginic acid by digesting alginic acid in methanol in the presence of an acid esterification catalyst, filtering off the resulting insoluble methyl ester, washing the ester first with methanol and then with acetone, and drying the washed ester, digesting the resulting ester in the presence of an acid acceptor with chlorosulfonic acid at a temperature of about 77° C. for a period of from about 0.5 to about 2 hours, diluting the reaction mixture with water at the melting point of ice, adding the resulting aqueous solution to a multiple volume of ethanol, separating the resulting precipitate, washing it in turn with ethanol and acetone, and drying it, dissolving the dried material in 12 times its weight of 50% aqueous acetone, adjusting the solution to a pH of 7.5 by adding a basic sodium compound, precipitating the resulting sodium salt of sulfated alginic acid methyl ester by adding to the solution a multiple volume of anhydrous acetone, whereby a fraction of sulfated alginic acid methyl ester having an average molecular weight in the approximate range 7200–8000 is obtained in the form of a sodium salt.

7. The method of preparing a fraction of sulfated alginic acid methyl ester freed of relatively high- and relatively low-molecular-weight constituents which comprises: preparing the methyl ester of alginic acid by digesting alginic acid in methanol in the presence of an acid esterification catalyst, filtering off the resulting insoluble methyl ester, washing the ester first with methanol and then with acetone, and drying the washed ester, digesting the resulting ester in the presence of an acid acceptor with sulfamic acid at a temperature of about 105° C. for a period of about 1 to about 5 hours, diluting the reaction mixture with water at the melting point of ice, adding the resulting aqueous solution to a multiple volume of ethanol, separating the resulting precipitate, washing it in turn with ethanol and acetone and drying the precipitate.

References Cited in the file of this patent

UNITED STATES PATENTS

| | | |
|---|---|---|
| 2,508,433 | Snyder | May 23, 1950 |
| 2,727,889 | Alburn | Dec. 20, 1955 |
| 2,758,110 | Lindner | Aug. 7, 1956 |
| 2,860,130 | McNeely et al. | Nov. 11, 1958 |
| 2,937,117 | Cottet et al. | May 17, 1960 |
| 2,940,898 | Denison | June 14, 1960 |

UNITED STATES PATENT OFFICE
CERTIFICATE OF CORRECTION

Patent No. 3,115,488                          December 24, 1963

Harvey E. Alburn

It is hereby certified that error appears in the above numbered patent requiring correction and that the said Letters Patent should read as corrected below.

Column 5, line 46, for "will" read -- well --; line 54, for "liquids" read -- lipids --.

Signed and sealed this 26th day of May 1964.

(SEAL)
Attest:
ERNEST W. SWIDER                          EDWARD J. BRENNER

Attesting Officer                           Commissioner of Patents